(12) United States Patent  (10) Patent No.: US 7,805,529 B2
Galluzzo et al.  (45) Date of Patent: Sep. 28, 2010

(54) METHOD AND SYSTEM FOR DYNAMICALLY CHANGING USER SESSION BEHAVIOR BASED ON USER AND/OR GROUP CLASSIFICATION IN RESPONSE TO APPLICATION SERVER DEMAND

(75) Inventors: Joseph D. Galluzzo, Raleigh, NC (US); Al Chakra, Cary, NC (US); Patrick Joseph O'Sullivan, Dublin (IE); Sean Callanan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 11/457,592

(22) Filed: Jul. 14, 2006

(65) Prior Publication Data

US 2008/0016214 A1 Jan. 17, 2008

(51) Int. Cl.
  *G06F 15/16* (2006.01)
  *G06F 11/00* (2006.01)
  *G06F 9/46* (2006.01)
(52) U.S. Cl. ........................ 709/229; 709/227; 709/228; 714/4; 718/103
(58) Field of Classification Search ........................ 705/8; 709/227, 228, 229; 714/4; 718/103
  See application file for complete search history.

(56) References Cited

U.S. PATENT DOCUMENTS

| | | | |
|---|---|---|---|
| 5,951,694 A * | 9/1999 | Choquier et al. ............... | 714/15 |
| 6,587,876 B1 | 7/2003 | Mahon et al. | |
| 6,779,017 B1 * | 8/2004 | Lamberton et al. .......... | 709/203 |
| 6,822,940 B1 | 11/2004 | Zavalkovsky et al. | |
| 6,880,156 B1 * | 4/2005 | Landherr et al. ............. | 718/105 |
| 7,076,555 B1 * | 7/2006 | Orman et al. ................ | 709/227 |
| 2002/0046096 A1 | 4/2002 | Srinivasan et al. | |
| 2002/0160811 A1 | 10/2002 | Jannette et al. | |
| 2003/0012143 A1 | 1/2003 | Chen et al. | |
| 2003/0031164 A1 | 2/2003 | Nabkel et al. | |
| 2004/0136379 A1 | 7/2004 | Liao et al. | |
| 2004/0153545 A1 * | 8/2004 | Pandya et al. ................ | 709/226 |
| 2005/0120045 A1 | 6/2005 | Klawon | |

FOREIGN PATENT DOCUMENTS

EP    0275678 A1    7/1988

OTHER PUBLICATIONS ngTracker, a J2EE session monitoring product by netGeneric. (http://www.netgeneric.com/products/ngTracker.html).
Wily Portal Manager (http://www.wilytech.com/pdf/whitepapers/Wily_WhitePpr_PortalManagerIBM.pdf).

* cited by examiner

*Primary Examiner*—Vivek Srivastava
*Assistant Examiner*—Lin Liu
(74) *Attorney, Agent, or Firm*—David A. Dagg

(57) ABSTRACT

A system for dynamically changing session behavior based on user and/or group classification in response to server demand. The system operates to dynamically alter current session behavior experienced by individual users and/or groups of users in response to monitored server demand. An intelligence server provides application servers with actions to be taken to dynamically change current user sessions, in response to current server demand, for example based on rules known by a rules engine within the intelligence server. A ranking system within the intelligence server takes its input from a monitoring system also in the intelligence server, and dynamically keeps track of individual user's relative ranks against other users that are actively being monitored.

25 Claims, 6 Drawing Sheets

METHOD AND SYSTEM FOR DYNAMICALLY CHANGING USER SESSION BEHAVIOR BASED ON USER AND/OR GROUP CLASSIFICATION IN RESPONSE TO APPLICATION SERVER DEMAND

FIELD OF THE INVENTION

The disclosed system relates generally to systems for managing user sessions with application server systems, and more specifically to a method and system for dynamically changing user session behavior based on user and/or group classification in response to application server demand.

BACKGROUND OF THE INVENTION

As it is generally known, application server computer systems are often used to provide various specific types of services to multiple users. The users of application servers typically consume the provided services through client software executing on client computers. The client computers interact with the application servers over a communication network such as the Internet. Existing systems for providing services from application servers have significant shortcomings, as illustrated by the following examples.

Electronic commerce ("e-commerce") is one example of a service provided by application servers to end users. E-commerce typically involves doing business via the World Wide Web ("Web"), and generally enables online purchasing of goods and/or services. Well known existing e-commerce systems include eBay®, Amazon.com, and MSN Hotmail. E-commerce Web sites must support large numbers of customers simultaneously. For example, use of a hypothetical e-commerce site could grow to an average of 250,000 concurrent users at any given time. A company providing such a site might use a five node cluster of application server computer systems to support these customers and their interactions with the site, for an average of 50,000 users per node. The company may have performed prototyping and system performance measuring before the servers went into service showing a significant reduction in quality of service when there are over 55,000 users per node. Accordingly, the company might like to keep the number of users on each node equal to or less than this threshold value so that they can assure a positive end user experience. However, a catastrophic failure might occur at some point, in which one of the five nodes suffer an unrecoverable error. At such a time, 20% of the users (50,000) have to be dealt with in some failover capacity. However, the performance metrics show that each of the remaining four nodes could handle only an additional 5,000 users without a significant degradation in system performance. These circumstances would allow only 20,000 users to failover gracefully, leaving an additional 30,000 users who must have their sessions terminated. The customers currently using the e-commerce site at the time of the failure, and that might accordingly be affected by the failure, could have a variety of different attributes. It would be desirable to consider these user attributes when determining how the affected users are treated by the application servers as the per server demand increases because of the failure.

For example, a first user with an active user session at the time of the increased server demand might log onto the e-commerce site often, and average a $5 purchase per session. Another active user might be an established customer averaging a $20 purchase per session. Still another user might be a new customer without a purchase history, who was in the middle of attempting a first purchase at the site at the time of the failure. Other users might be customers that log in to check prices and compare deals, but rarely make purchases. Unfortunately, existing technology does not take into consideration such differences between currently active users when determining which users to failover gracefully, and which to kick off a system in the face of a server failure or other events causing an increase in server demand beyond a predetermined threshold.

In another example of the shortcomings of existing systems, an information technology ("IT") department head for a large cable television corporation may have responsibility for an externally available portal Web site that attracts many visitors each month. The portal provides multiple access levels for end users:

1. Anonymous access—Anonymous access is used by customers (or potential customers) to find out about products, services, information, FAQ's, etc. about the company.

2. Silver access—Silver access is used by regular account holders that have purchased a single product or service. Silver account holders have access to all of the information (portlets) that Anonymous access users have access to, and additionally have the ability to view and pay their bill online, have customized channel listings, and change their programming options or order a pay-per-view movie.

3. Gold access—Gold access is for premium account holders that have purchased multiple products/services into a combined package. Gold access customers have access to all of the information (portlets) that Silver access users have, plus they have the ability to watch live events online, view information on exclusive content before it is televised, and also have the ability to download/replay certain video clips of an event that they may have missed.

The IT department head may be informed that customer satisfaction has been low for Silver access customers, but has been quite acceptable for the Gold access customers. As part of an effort to increase customer satisfaction for the Silver access account holders, the department head would accordingly like to offer the same content to the Silver access customers as provided to Gold access customers, but without downgrading the performance/satisfaction of the Gold access customers. Unfortunately, funds maybe insufficient to purchase the new server systems required to fully support Gold level services for the Silver access customers at all times. Accordingly, the department head may desire to offer additional services to the Silver access users with the current server configuration at times when server demand is within acceptable levels. Existing systems also do no provide the ability to do this.

Both the above examples demonstrate a need to dynamically change application server behavior for current user sessions, based on user classification and/or group membership and responsive to a current level of server demand. When a server's resource availability and/or performance are within a predefined, acceptable level, then it would be desirable for the system to operate as usual, for example by distributing access evenly across different users/groups. But when a server's predefined resource availability and/or performance threshold is reached, for example due to stress under load, failure, etc., then a privileged user/group type should have priority on system resources. In the above IT department example, such a system would be desirable since it could ensure that the Gold access members have the required resources, for example on a Portal Server or other type of Application Server, even when server demand is high. When the demand came is within acceptable levels, it would be desirable to be able change access control lists (ACLs) or the like to allow Silver access users to access Gold level content. Such a system enable the content provider to enhance the experience of Silver access customers, while still preserving the existing performance experience for Gold access customers.

Some existing packet forwarding systems provide service monitoring in conjunction with a policy server that makes decisions on where to route packets based on server congestion. However, such systems fail to describe or suggest operating on an individual user or group level, and/or making intelligent decisions at the individual user/group level for individual user sessions with an application server. Moreover, such systems do not dynamically change a current user's application session behavior based on application server congestion, and are instead concerned with overloaded devices such as routers, switches, etc., therefore not taking into account individual users on a specific application server.

Other existing systems are rule based systems for allowing or denying access to network services. Such systems may include techniques for associating a policy to a network resource, grouping resources/policies, mapping a username to an Internet Protocol (IP) address, and providing dynamically mapped user and hostnames with network devices. Although such systems are sometimes rule based, whereby network policies can be applied to users and groups, they do not describe or suggest monitoring of application server resources/performance as an input to changing user application session behavior. Instead, these existing systems only describe mapping users/groups to network resource policies, without regard to server demand or user application session behavior provided by application servers.

Various session monitors exist that track user actions during a session, and that track performance data, but these monitors do not provide or suggest any mechanism by which this data would be used to alter the behavior of a particular user's application session during a failover scenario, and/or when the overall server response is no longer meeting predefined performance characteristics. Likewise, some previous applications may include performance monitoring of individual portlets on a portal server, and can determine if an individual application (portlet) on the server is causing performance problems, but they do not attempt to dynamically change user/group session behavior during any given action. Instead, such systems may notify an administrator that there is a problem with the server and which application(s) is the culprit for the problem.

For the above reasons and others, it would be desirable to have a new method and system that dynamically changes session behavior for a user or group of users in response to server demand.

SUMMARY OF THE INVENTION

To address the above described and other shortcomings of existing systems, a new method and system are disclosed for dynamically changing user application session behaviour based on user and/or group classification in response to application server demand. The disclosed system operates to dynamically alter current user application session behaviour experienced by individual users and/or groups of users in response to monitored application server demand.

In one embodiment, an intelligence server communicates with a number of application servers that provide the intelligence server with information regarding the demand currently being experienced by the server systems, such as the current number of users per application server node, and/or the current throughput per user, as well as individual user session information, such as whether individual users currently have active application sessions, whether individual users are currently involved in important transactions or operations, and/or other information describing the session activities of individual users. The intelligence server provides the application servers with actions to be taken to dynamically change current user sessions, for example based on rules maintained by the intelligence server, in response to application server demand thresholds being reached.

The intelligence server may, for example, include three software subsystems: (1) a ranking system, (2) a monitoring system, and (3) a rules engine. The ranking system receives inputs from the monitoring system, and dynamically keeps track of individual user's relative ranks against other users that are being monitored. Actions that the ranking system performs may include, but are not limited to:

Adding/removing users from a user ranking list as user sessions with the application servers become active or are terminated, in response to user session information obtained from the monitoring system.

Sorting the user ranking list based on the current session activities of users, the past session activity history of users, predefined group memberships of users, or any combination of these inputs.

Sorting users into various groups.

Reporting to the rules engine the current ranking or status of any user or group of users.

The monitoring system takes its input from the application servers, and is responsible for monitoring various activities on the application servers. Actions that the monitoring system may perform include, but are not limited to:

Monitoring users' online activities from the time they begin application sessions on the application servers until the sessions end.

Tracking a total number of current user sessions per application server node, and a total number of current user sessions across all application server nodes at any given time.

Tracking a user's current application session activity to report to the ranking system.

Communicating with the application servers to track the overall health of the application server nodes (e.g. whether each application server node is available or not), average response times for user actions performed per node, etc.

Reporting to the rules engine the current status of the application servers' operational health, throughput, etc.

The rules engine is a system that takes its input from the monitoring system and the ranking system for the purpose of determining whether to trigger a rule, and to determine whether an action needs to be sent to the application servers. Actions that the rules engine performs may include, but are not limited to:

Determining if the current application server status obtained from the monitoring system is within an acceptable level with regard to server demand.

Determining from the monitoring system and the ranking system how many users should be affected based on rule sets.

Revoking access of specific users to specific application content or features (portlets, applications, etc) by modifying current session information in the application servers.

Restoring a privileged user's session in a failover scenario.

Altering a user's session behaviour by issuing commands to the servers.

Terminating a user's session in a graceful way, whereby session data is saved to disk and could be later recovered when the user logs in at a later time after necessary resources have been freed up.

This embodiment of disclosed system is able to intelligently and dynamically handle alterations to a user's session based on the interactions of the ranking system, the monitoring system, the rules engine, and the application servers. The disclosed system is advantageous to any service provider desiring to improve the quality of service delivered to specific users at the individual user application session level.

Thus there is disclosed a new method and system that dynamically changes user application session behaviour for a user or group of users in response to monitored levels of application server demand.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
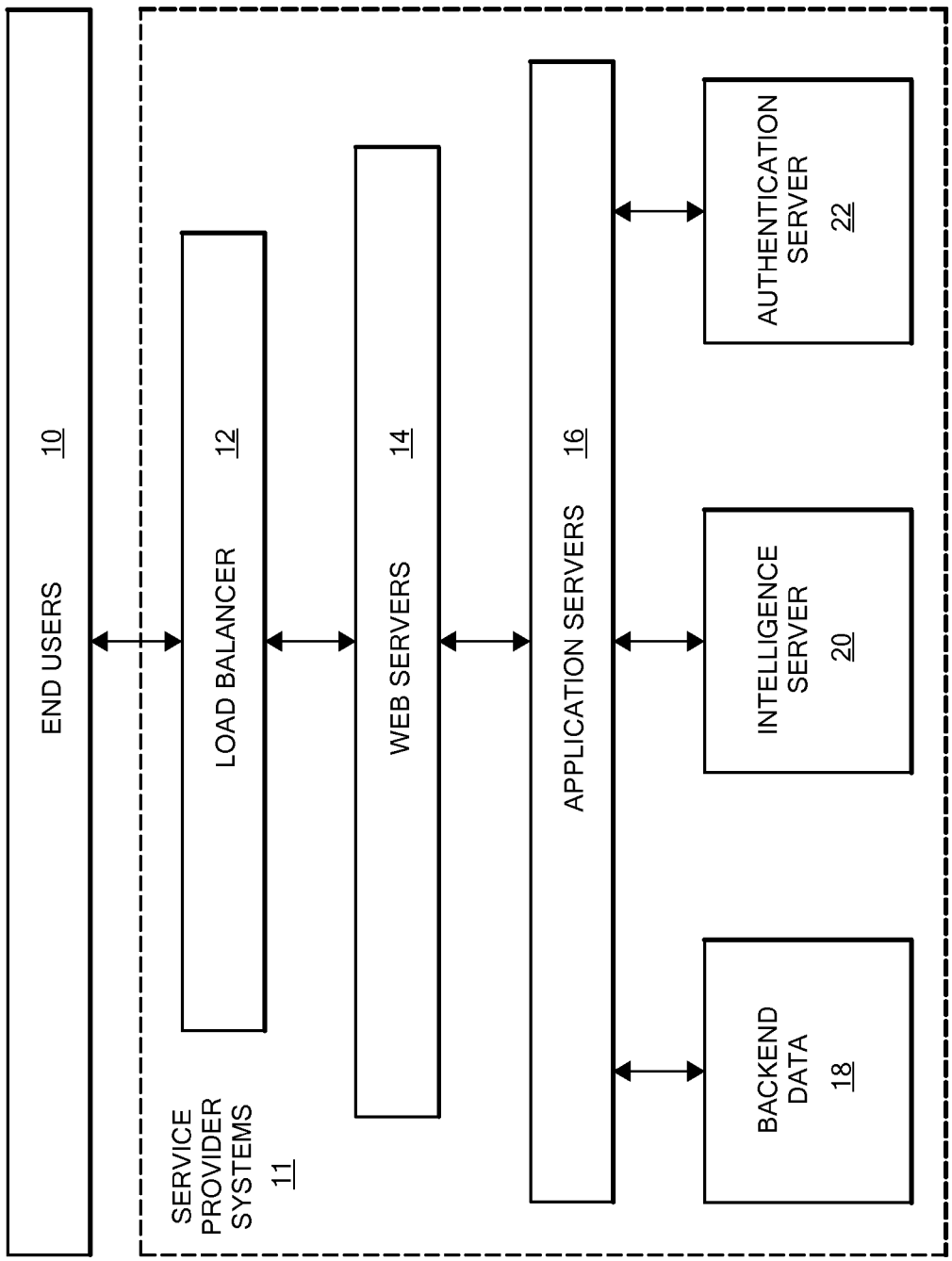
FIG. 1 is a block diagram showing components in an execution environment of an illustrative embodiment of the disclosed system.

FIG. 1 is a block diagram showing components in an execution environment of an illustrative embodiment of the disclosed system. As shown in FIG. 1, a number of End Users 10 communicate with Service Provider Systems 11 in order to access services provided by way of user application sessions. Each of the End Users 10 may have a client system associated with them, on which may be executing client program code such as or including a Web Browser application program or other client application software through which each of the End Users 10 can establish a user application session.

The service provider systems 11 are shown including a Load Balancer 12, which operates to more evenly distribute request processing across available resources in the service provider systems 11. The Load Balancer 12 may operate to evenly distribute user session and/or other requests received from the End Users 10 across the Web Servers 14 and/or Application Servers 20. The Web Servers 14 operate to manage user requests and deliver Web pages to Web Browser programs associated with the End Users 10 via the HTTP protocol, and may include TCP/IP protocol software.

The Application Servers 16 include or run server portions of one or more software application programs. For example, application program servers provided through the Application Servers 16 may handle the business logic and data access for one or more applications. The Application Servers 16 interact with the Backend Data 18 in order to obtain and maintain up to date data for the user application sessions they provide, and with the Authentication Server 22 to authenticate the End Users 10 as necessary when establishing user application sessions.

Each of the user application sessions provided by the Application Servers 16 in cooperation with the other systems in the Service Provider Systems 11 may, for example, consist of a period of activity between a corresponding one of the End Users 10 and any specific type of Web site provided by the Service Provider Systems 11. The number of user application sessions currently active on such a Web site may be used as a measure of the current demand for the Application Servers 16. Similarly, each user application session provided by the Application Servers 16 in cooperation with the other systems in the Service Provider Systems 11 may consist of a period of time that one of the End Users 10 interfaces with any specific type of application provided by the Service Provider Systems 11, beginning when the user accesses the application and ending when the user quits the application. Example types of Web sites and/or applications provided by Application Servers include e-commerce, corporate information Web sites, electronic mail Web sites, Internet search Web sites, and/or any other specific type of Web site or application.

The disclosed system may be embodied such that users are authenticated at the beginning of each session by logging in, and sessions are ended by the user explicitly logging out. For example, users may be authenticated by way of a single sign-on process in which a single user name and password are entered to access more than one application and/or a number of resources provided through the Service Provider Systems 11, through an application specific authentication process for each service or application, or using some other type of authentication process.

The Load Balancer 12, Web Servers 14, Application Servers 16, Backend Data 18, Authentication Server 22 and Intelligence Server 20 may be embodied as any specific number of software processes and/or components executing on some number of computer systems that are communicably connected, for example by way of a communication network such as the Internet, a Local Area Network (LAN), or other specific type of communication system or network. Such computer systems may, for example, each consist of at least one processor, program storage, such as memory, for storing program code executable on the processor, one or more input/output devices and/or interfaces, such as data communication and/or peripheral devices and/or interfaces, and may each further include appropriate operating system software.

The client systems used by End Users 10 to establish user application sessions with the Application Servers 16 may include any specific type of computer system or other type of device that can instantiate an IP (Internet Protocol) connection. Accordingly, examples of such client systems may include, but are not limited to, desktop computer systems, PDAs (Personal Digital Assistants), cell phones, tablet PCs, or any other appropriate device capable of instantiating an IP connection or the like on which a user application session can be provided.

Figure 2:
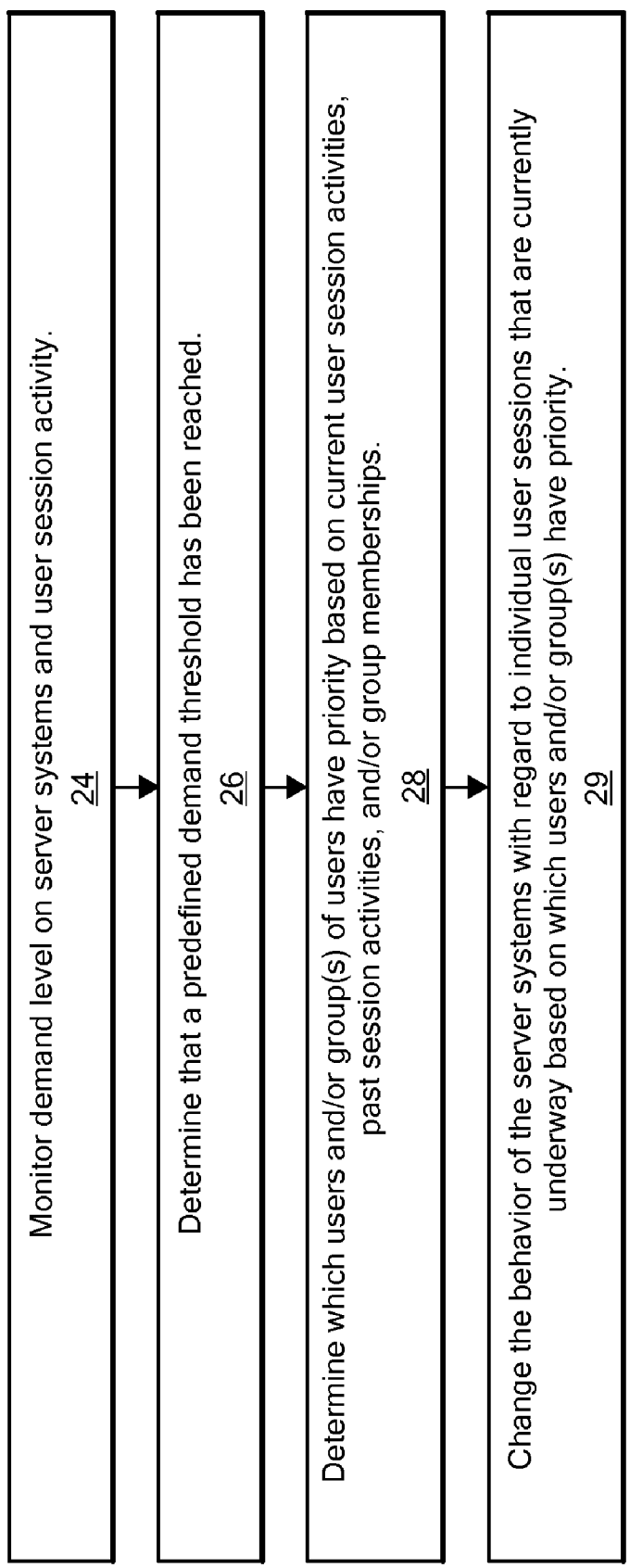
FIG. 2 is a flow chart illustrating steps performed in an illustrative embodiment of the disclosed system.

Operation of an illustrative embodiment of the disclosed Intelligence Server 20 is now described with reference to FIG. 2. While FIG. 2 is a flow chart illustrating steps performed during operation of an illustrative embodiment, the order of the steps shown in FIG. 2 is intended only for purposes of illustration, and the actual order of the actions described with reference to FIG. 2 is not limited to that order. Accordingly, the actions described with reference to FIG. 2 may be performed partly or wholly in parallel, and/or in any appropriate order for a particular embodiment.

As shown in FIG. 2, the Intelligence Server 20 operates to monitor the demand level on the Application Servers 16 at step 24. For example, the demand level monitored at step 24 may reflect a total number of user application sessions that are currently active on the Application Servers 16. The Intelligence Server 20 further may also or alternatively operate at step 24 to monitor the total demand on individual server systems within the Application Servers 16, also based on the number of user application sessions currently active on each server system within the Application Servers 16. Other measures of current demand on all or individual ones of the Application Servers 16 may be used as may be appropriate for a given embodiment, including but not limited to the current delay or throughput being experienced by and/or available to each user with an active user application session, or some other specific measure of application server demand.

Further at step 24, the Intelligence Server 20 monitors user application session activity between the End Users 10 and the Application Servers 16. For example, the Intelligence Server 20 may keep track of when individual users start and end sessions, such as when they log on and log off of the Application Servers 16. The Intelligence Server 20 may also monitor the current activities of individual users, such as whether individual users are currently involved in critical transactions. Critical transactions may be defined as any important interaction with the Application Servers 16 that relates to the quality of experience for the user. These important interactions may include performing an initial purchase transaction with an e-commerce application, performing any purchase transaction with an e-commerce application, accessing Web site resources that are considered key resources, or any other specific kind of interaction. Users that are currently performing a critical transaction may, for example, be given a higher priority than other users.

The Intelligence Server 20 may also keep a per-user transaction history for purposes of ranking users based on their past activities. For example, a user with a transaction history that includes a relatively large number and/or value of purchases in their transaction history might be given a higher priority than other users with a lower number and/or value of purchases.

At step 26, the Intelligence Server 20 determines that a threshold level has been reached with regard to demand on the Application Servers 16. For example, at step 26 the Intelligence Server 20 may determine that the number of currently active user application sessions on the Application Servers 16 may have exceeded a predetermined or configured maximum value. Similarly, at step 26, the Intelligence Server 26 may determine that an individual server system in the Application Servers 16 may have exceeded a predetermined or configured maximum number of active user application sessions. In another embodiment, the Intelligence Server 26 may operate at step 26 to determine that an average amount of throughput provided to each currently active user application session with the Application Servers 16 has dropped below a threshold minimum. Similarly, the disclosed system may operate at step 26 to detect that some amount of resources and/or server systems within the Application Severs 16 have failed. The preceding threshold determinations are given only for purposes of example, and the disclosed system may be embodied to detect that any specific type of application server demand threshold has been reached at step 26.

At step 28, the Intelligence Server 20 determines which users and/or groups of users should be considered to have relatively higher priority than others. The determination at step 28 may be based on current session activities, past session activities, and/or group memberships of individual users. At step 29, the Intelligence Server 20 changes the behavior of the Application Servers 16. The changes performed at step 29 are with regard to specific user application sessions that are currently underway, and are based on the priorities of individual users associated with those sessions as determined at step 28.

For example, the changes performed at step 29 may include dynamically modifying current user session information to transparently move one or more current user sessions of relatively higher priority users from an application server system node that has failed to another application server system node, while simply terminating the current user sessions of some number of users that are relatively lower ranked. Similarly, the changes performed at step 29 may include terminating a number of user sessions of user with relatively higher rankings such that session data is saved to a disk on the Application Servers 16, and can be subsequently recovered when those relatively higher ranked users subsequently logs in at a later time when demand for the application servers no longer exceeds a predetermined threshold, while terminating the current user sessions of some number of users that are relatively lower ranked without saving session data.

The changes at step 29 may also or alternatively include dynamically modifying current user sessions by disabling access by a lower priority group of users to certain content and/or services provided by the Application Servers 16, such as in the event that demand for the Application Servers 16 exceeds a demand level above which access to that content and/or services cannot be provided to both the lower priority group of users and a higher priority group of users without degrading the quality of service provided to the higher priority group of users below an acceptable level.

Figure 3:
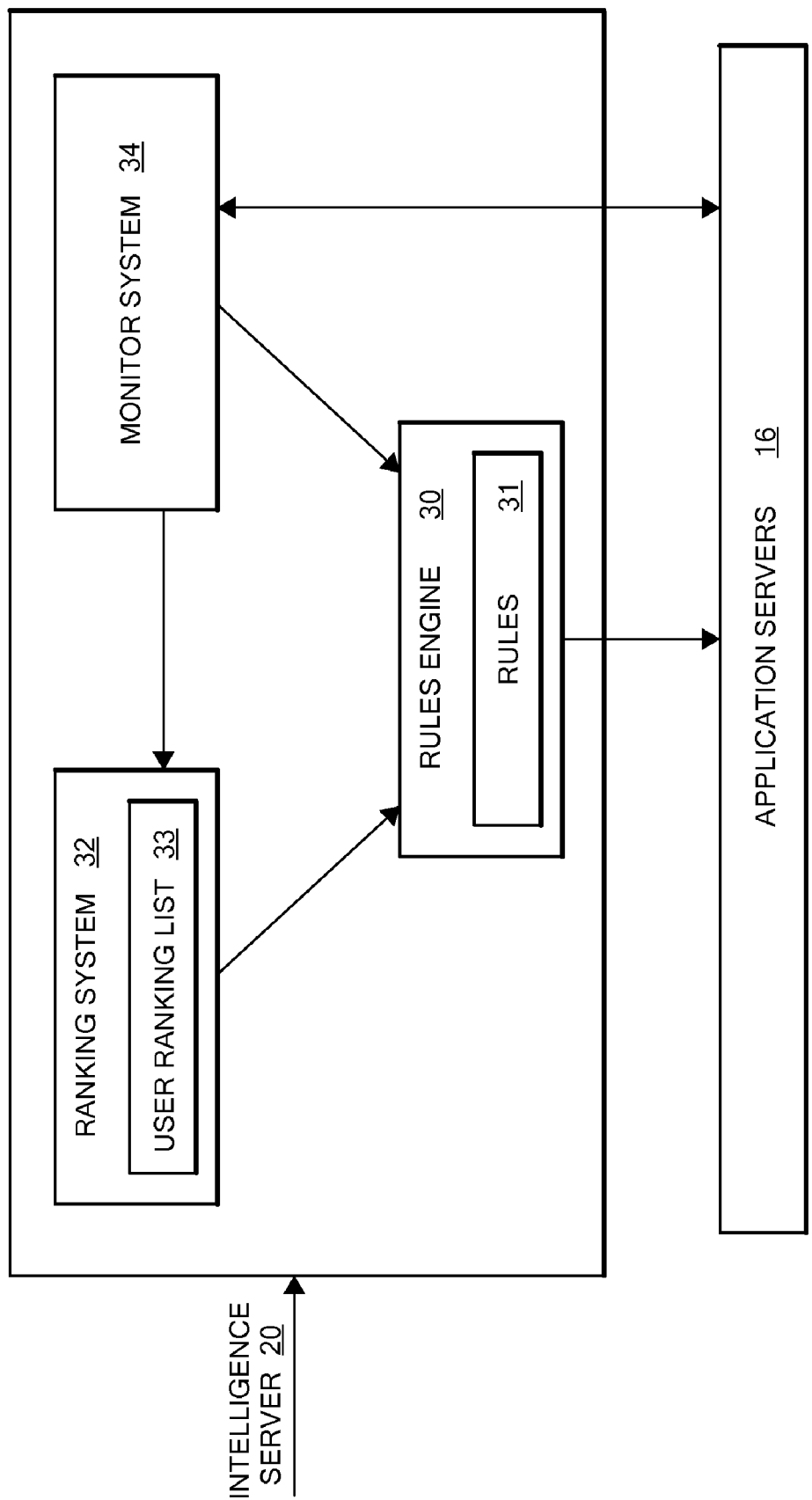
FIG. 3 is a block diagram showing components in an illustrative embodiment of the disclosed system.

FIG. 3 is a block diagram showing components in an illustrative embodiment of the disclosed system. As shown in FIG. 3, the Intelligence Server 20 may be embodied to include a Ranking System 32, a Monitoring System 34, and a Rules Engine 30. The Ranking System 32, Monitoring System 34 and Rules Engine 30 may, for example, be embodied as software components executing on the Intelligence Server 20.

The Ranking System 32 maintains a User Ranking List 33, and obtains information from the Monitoring System 34. The Ranking System 32 provides information to the Rules Engine 30. In addition to the information from the Ranking System 32, the Rules Engine 30 also obtains information from the Monitoring System 34. The Monitoring System 34 obtains information from the Application Servers 16, and the Rules Engine 30 performs actions on the Application Servers 16.

Figure 4:
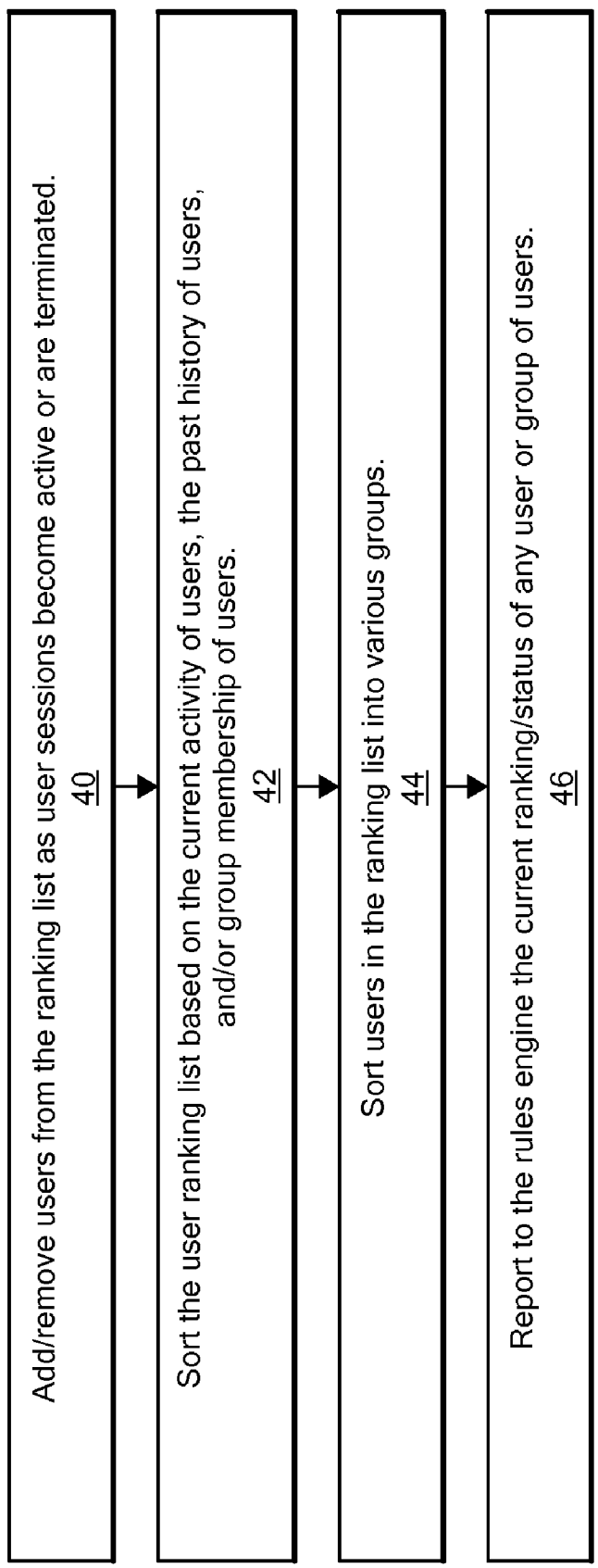
FIG. 4 is a flow chart diagram illustrating operations performed by a ranking system in an illustrative embodiment of the disclosed system.
Figure 5:
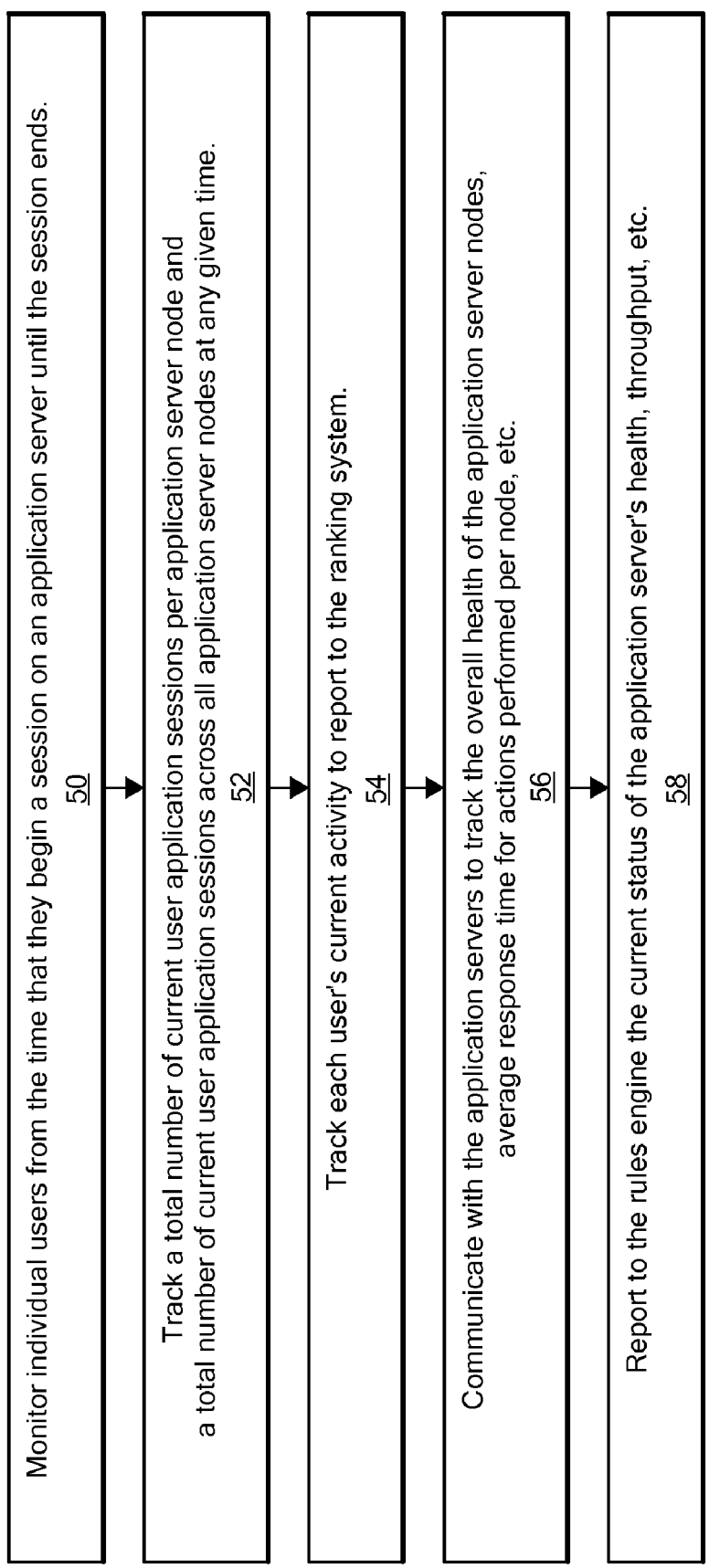
FIG. 5 is a flow chart diagram illustrating operations performed by a monitoring system in an illustrative embodiment of the disclosed system.
Figure 6:
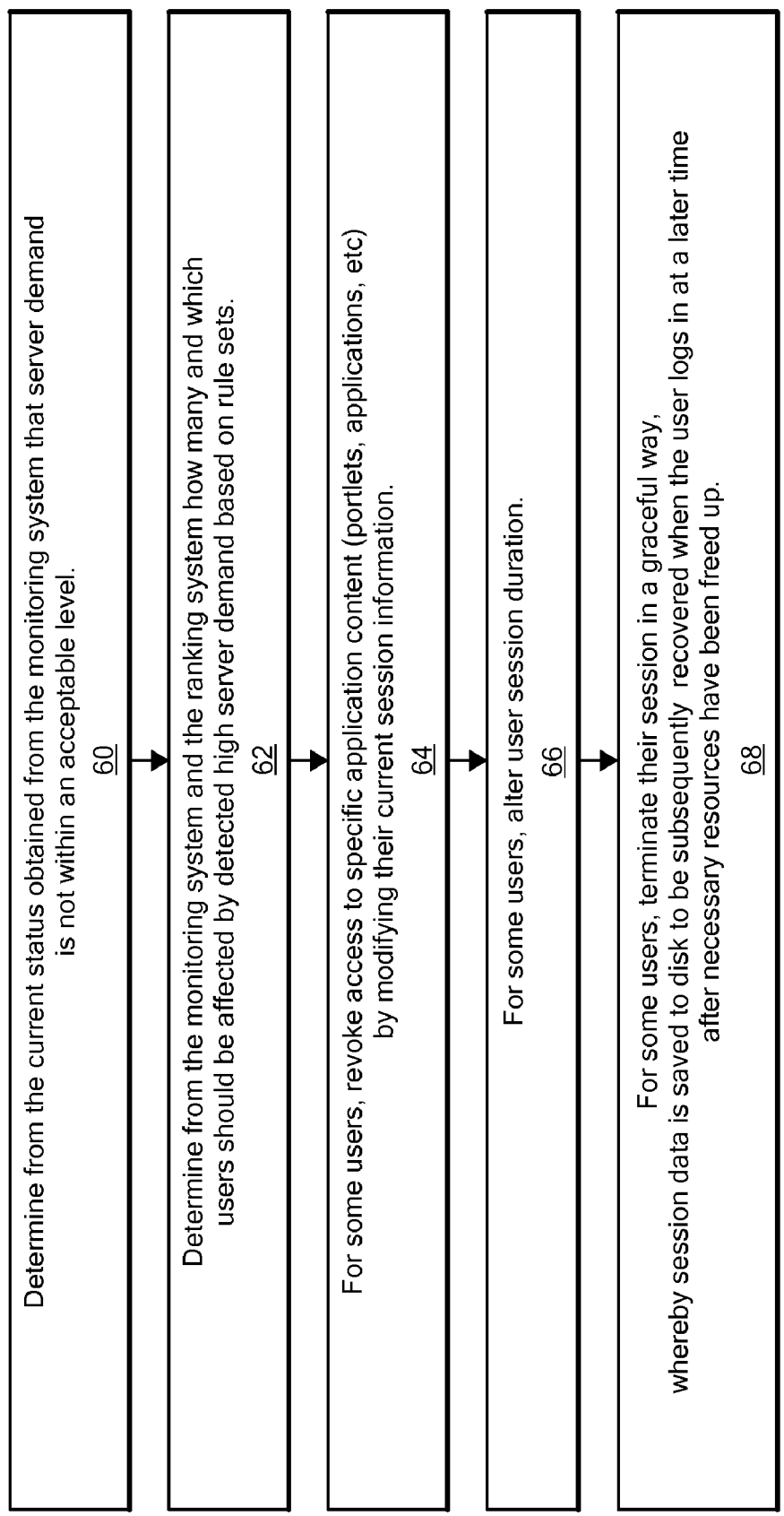
FIG. 6 is a flow chart diagram is a block diagram illustrating operations performed by a rules engine in an illustrative embodiment.

Operation of illustrative embodiments of the disclosed Ranking System 32, Monitoring System 34, and Rules Engine 30 are now described with reference to FIGS. 4, 5 and 6 respectively. While FIGS. 4, 5 and 6 are each flow charts illustrating operations performed during operation of an illustrative embodiment, the orders of the steps shown in FIGS. 4, 5 and 6 are intended only for purposes of illustration, and the actual order of the actions described with reference to FIGS. 4, 5 and 6 is not limited to the orders of steps shown in the Figures. Accordingly, the actions described with reference to FIGS. 4, 5 and 6 may be performed partly or wholly in parallel, and/or in any appropriate specific order for a particular embodiment.

As shown by step 40 of FIG. 4, the Ranking System 32 may add and/or remove users from the User Ranking List 33 as their user application sessions become active or are terminated. Information regarding user application sessions, including indications of whether user application sessions have been activated or terminated, and/or other information regarding user activities during user application sessions, is obtained by the Ranking System 32 from the Monitoring System 34.

As shown by step 42, the Ranking System 32 sorts the User Ranking List 33 based on the current activities of users, the past activities of users, and/or the predefined group memberships of users, or any combination of these criteria.

As shown by 44, the Ranking System 32 operates to sort users in the User Ranking List 33 into various groups. Individual users may be members of 0, 1 or more groups. The group membership of a user may indicate how privileged that user is (e.g. "gold" privileges users, "silver" privileges users, anonymous users, etc), and accordingly may be reflected in that user's position within the User Ranking List 33. Examples of groups that a user may belong to may reflect the geographic location of a user, such as what country or region a user is accessing the Application Servers 16 from (e.g. "U.S. users", "Europe users", etc.), whether the user is an administrator of the system (e.g. "admin users", etc.), how long a user has been a customer (e.g. "new users", "established users", etc), or any other specific user attribute. The priorities associated with specific groups to which a user belongs thus may affect that user's position within the User Ranking List 33.

The sortings performed at steps 42 and 44, and the resulting ordering of users within the User Ranking List 33, allows the disclosed system to determine relative priorities between individual users to be used when allocating or de-allocating resources in the face of relatively high server demand. At step 46, the Ranking System 32 provides the Rules Engine 30 with the current relative ranking and/or other specific status of any individual user and/or group of users. The information provided at step 46 enables the Rules Engine 30 to send actions to the Application Servers 16 that may affect how the Application Servers 16 provide the user application sessions of various end users. Such actions are selected at least partly in response to the user rankings maintained by the Ranking System 32.

As shown by step 50 in FIG. 5, the Monitoring System 34 monitors users from the time they begin each user application session until the session is ended. The monitoring done at step 50 enables the Monitoring System 34 to keep track of which users are currently involved in a user application session at any given time. At step 52, the Monitoring System 34 tracks the total number of user application sessions at each node among the Application Servers 16, as well as the total number of user application sessions at all the Application Servers 16. At step 54 the Monitoring System 34 tracks each user's current activities in user application sessions with the Application Servers 16. The current activities of each user monitored at step 54 are reported to the Ranking System 32, and may affect each user's relative priority ranking in the User Ranking List 33. At step 56 the Monitoring System 34 communicates with the Application Servers 16 to determined the overall operational health of each server node, such as whether each server node is currently operational, and more specific operational performance information regarding each server node, such as the average response time for user actions performed on each node and the like. At step 58, the Monitoring System 34 reports monitoring information, including but not limited to the information obtained at steps 50, 52 and 56, to the Rules Engine 30.

As shown by step 60 in FIG. 6, the Rules Engine 30 determines, based on information obtained from the Monitoring System 34 and rules contained in the Rules 31, whether the current level of server demand is within an acceptable level. For example, at step 60 the Rules Engine 30 compares current server demand across all of the Application Servers 16 with a rule specified threshold to determine whether current server demand is within an acceptable level. In the event that the current server demand level is higher than is acceptable, then one or more rules may indicate that some number of users having current application user sessions will be affected by the resulting actions taken by the Rules Engine 30. Accordingly, at step 62, the Rules Engine 30 determines how many users are to be affected by actions taken in response to a level of server demand that exceeds a pre-determined threshold, and potentially also specifically identifies those users. At step 64 access to specific application content and/or services, such as specific portlets or applications, may be revoked for some current user sessions by modifying the corresponding current session information for those sessions or the corresponding users. Such revocations may, for example be accomplished by altering access control lists (ACLs) or the like in the Application Servers 16. At step 66 the application user sessions for some users may be terminated entirely. To do so, for example, the Rules Engine 30 may issue commands to the Application Servers 16, such as invalidate( ) from javax.servlet.http:, or for .NET applications issuing FormsAuthentication.SignOut. Also, or in the alternative, at step 68, the Rules Engine 30 may terminate some users' sessions gracefully, saving session data to disk so that it can subsequently be recovered when those users log in at a later time, after resource availability improves to the point where there is no longer excessive server demand.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A system including at least one processor and at least one computer readable memory, said computer readable memory having program code stored thereon for, when executed on said at least one processor, managing user application sessions, said program code comprising:
    program code for monitoring demand for at least one application server system, wherein said monitoring includes detecting that demand for said application server system has exceeded a predetermined threshold;
    program code for ranking a plurality of users, wherein said ranking includes determining a relative priority for each of said users;
    program code for, responsive to said demand and said relative priority of said at least one user, dynamically modifying at least one current user session of one of said users, wherein said current user session is with said application server system, and wherein said modifying includes allocating resources of said application server system for said current user session based on said relative priority of said one of said users;
    wherein said program code for monitoring demand for said at least one application server system includes program code for detecting that demand for said application server system has exceeded said predetermined threshold by detecting that demand for said application server system has exceeded a level of demand above which access to certain content on said application server system cannot be provided to both a first group of users and a second group of users without degrading the quality of service provided to said first group of users below an acceptable level; and
    wherein said program code for dynamically modifying said current user session includes program code for disabling access by said second group of users to said certain content on said application server system responsive to said detecting that said demand for said application server system exceeds said level of demand above which access to said certain content on said application server system cannot be provided to both said first group of users and said second group of users without degrading the quality of service provided to said first group of users below said acceptable level, and wherein said disabling access by said second group of users to said certain content on said application server includes revoking access by said second group of users to at least one portlet by altering at least one access control list stored in said application server system responsive to said detecting that said demand for said application server system exceeds said level of demand above which access to said certain content on said application server system cannot be provided to both said first group of users and said second group of users without degrading the quality of service provided to said first group of users below said acceptable level.

2. The system of claim 1, wherein said relative priority of said one of said users comprises a priority assigned to a group of users to which said user belongs.

3. The system of claim 1, wherein said program code for monitoring demand for said application server system comprises program code for determining a current number of user sessions with said application server system, and wherein said threshold comprises a maximum number of user sessions.

4. The system of claim 1, wherein said at least one application server system comprises a plurality of application server system nodes, wherein said program code for monitoring demand for said application server system comprises program code for determining a current number of users having sessions with each of said application server system nodes, and wherein said threshold comprises a maximum number of user sessions for a single one of said application server system nodes.

5. The system if claim 1, wherein said program code for monitoring demand for said application server system comprises program code for determining a current level of throughput per user.

6. The system of claim 1, further comprising:
    wherein said at least one application server system comprises a plurality of server system nodes;
    wherein said program code for detecting that demand for said application server system has exceeded a predetermined threshold includes program code for detecting that one of said application server system nodes has failed; and
    wherein said program code for dynamically modifying said current user session comprises program code for transparently moving said current user session from said one of said application server system nodes that has failed to another one of said application server system nodes.

7. The system of claim 1, further comprising:
    wherein said at least one application server system comprises a plurality of application server system nodes;
    wherein said program code for detecting that demand for said server system has exceeded a predetermined threshold includes program code for detecting that one of said application server system nodes has failed; and
    wherein said program code for dynamically modifying said current user session comprises program code for terminating said current user session such that session data is saved to disk and can be subsequently recovered when the user subsequently logs in at a later time when said demand for said application server system no longer exceeds said predetermined threshold.

8. The system of claim 1, wherein said program code for ranking said plurality of users comprises program code for maintaining a list of said users in order of their relative priority, and wherein users are added to said list when they establish sessions with said application server system and removed from said list when they terminate such sessions.

9. The system of claim 8, wherein said program code for ranking said plurality of users is responsive to activities of said users during respective ones of said sessions.

10. The system of claim 8, wherein said program code for ranking said plurality of users is responsive to previous activities of said users during previous sessions.

11. The system of claim 8, wherein said program code for ranking said plurality of users is responsive to group memberships of said users.

12. The system of claim 1, wherein said program code for dynamically modifying is responsive to a set of rules.

13. A method of managing user application sessions, comprising:
    monitoring demand for at least one application server system, wherein said monitoring includes detecting that demand for said application server system has exceeded a predetermined threshold;
    ranking a plurality of users, wherein said ranking includes determining a relative priority for each of said users;
    responsive to said demand and said relative priority of said at least one user, dynamically modifying at least one current user session of one of said users, wherein said current user session is with said application server system, and wherein said modifying includes allocating resources of said application server system for said current user session based on said relative priority of said one of said users;

wherein said detecting that demand for said application server system has exceeded said predetermined threshold includes detecting that demand for said application server system has exceeded a level of demand above which access to certain content on said application server system cannot be provided to both a first group of users and a second group of users without degrading the quality of service provided to said first group of users below an acceptable level; and wherein said dynamically modifying said current user session comprises disabling access by said second group of users to said certain content on said application server system responsive to said detecting that said demand for said application server system exceeds said level of demand above which access to said certain content on said application server system cannot be provided to both said first group of users and said second group of users without degrading the quality of service provided to said first group of users below said acceptable level, and wherein said disabling access by said second group of users to said certain content on said application server includes revoking access by said second group of users to at least one portlet by altering at least one access control list stored in said application server system responsive to said detecting that said demand for said application server system exceeds said level of demand above which access to said certain content on said application server system cannot be provided to both said first group of users and said second group of users without degrading the quality of service provided to said first group of users below said acceptable level.

14. The method of claim 13, wherein said relative priority of said one of said users comprises a priority assigned to a group of users to which said user belongs.

15. The method of claim 13, wherein said monitoring demand for said application server system comprises determining a current number of user sessions with said application server system, and wherein said threshold comprises a maximum number of user sessions.

16. The method of claim 13, wherein said at least one application server system comprises a plurality of application server system nodes, wherein said monitoring demand for said application server system comprises determining a current number of users having sessions with each of said application server system nodes, and wherein said threshold comprises a maximum number of user sessions for a single one of said application server system nodes.

17. The method if claim 13, wherein said monitoring demand for said application server system comprises determining a current level of throughput per user.

18. The method of claim 13, further comprising:
wherein said at least one application server system comprises a plurality of server system nodes;
wherein said detecting that demand for said application server system has exceeded a predetermined threshold includes detecting that one of said application server system nodes has failed; and
wherein said dynamically modifying said current user session comprises transparently moving said current user session from said one of said application server system nodes that has failed to another one of said application server system nodes.

19. The method of claim 13, further comprising:
wherein said at least one application server system comprises a plurality of application server system nodes;
wherein said detecting that demand for said server system has exceeded a predetermined threshold includes detecting that one of said application server system nodes has failed; and
wherein said dynamically modifying said current user session comprises terminating said current user session such that session data is saved to disk and can be subsequently recovered when the user subsequently logs in at a later time when said demand for said application server system no longer exceeds said predetermined threshold.

20. The method of claim 13, wherein said ranking said plurality of users comprises maintaining a list of said users in order of their relative priority, and wherein users are added to said list when they establish sessions with said application server system and removed from said list when they terminate such sessions.

21. The method of claim 20, wherein said ranking said plurality of users is responsive to activities of said users during respective ones of said sessions.

22. The method of claim 20, wherein said ranking said plurality of users is responsive to previous activities of said users during previous sessions.

23. The method of claim 20, wherein said ranking said plurality of users is responsive to group memberships of said users.

24. The method of claim 13, wherein said dynamically modifying is responsive to a set of rules.

25. A computer program product including a physical computer readable storage medium, said physical computer readable storage medium having program code stored thereon for managing user application sessions, said program code comprising:
program code for monitoring demand for at least one application server system, wherein said monitoring includes detecting that demand for said application server system has exceeded a predetermined threshold;
program code for ranking a plurality of users, wherein said ranking includes determining a relative priority for each of said users;
program code for, responsive to said demand and said relative priority of said at least one user, dynamically modifying at least one current user session of one of said users, wherein said current user session is with said application server system, and wherein said modifying includes allocating resources of said application server system for said current user session based on said relative priority of said one of said users;
wherein said program code for monitoring demand for said at least one application server system includes program code for detecting that demand for said application server system has exceeded said predetermined threshold by detecting that demand for said application server system has exceeded a level of demand above which access to certain content on said application server system cannot be provided to both a first group of users and a second group of users without degrading the quality of service provided to said first group of users below an acceptable level; and
wherein said program code for dynamically modifying said current user session includes program code for disabling access by said second group of users to said certain content on said application server system responsive to said detecting that said demand for said application server system exceeds said level of demand above which access to said certain content on said application server system cannot be provided to both said first group of users and said second group of users without degrading the quality of service provided to said first group of users below said acceptable level, and wherein said disabling access by said second group of users to said certain content on said application server includes revoking access by said second group of users to at least one portlet by altering at least one access control list stored in said application server system responsive to said detecting that said demand for said application server system exceeds said level of demand above which access to said certain content on said application server system cannot be provided to both said first group of users and said second group of users without degrading the quality of service provided to said first group of users below said acceptable level.

* * * * *